Nov. 21, 1961  G. W. BAXTER  3,009,615
TABLE AND LUGGAGE CARRIER ASSEMBLY
Filed March 20, 1959  2 Sheets-Sheet 1
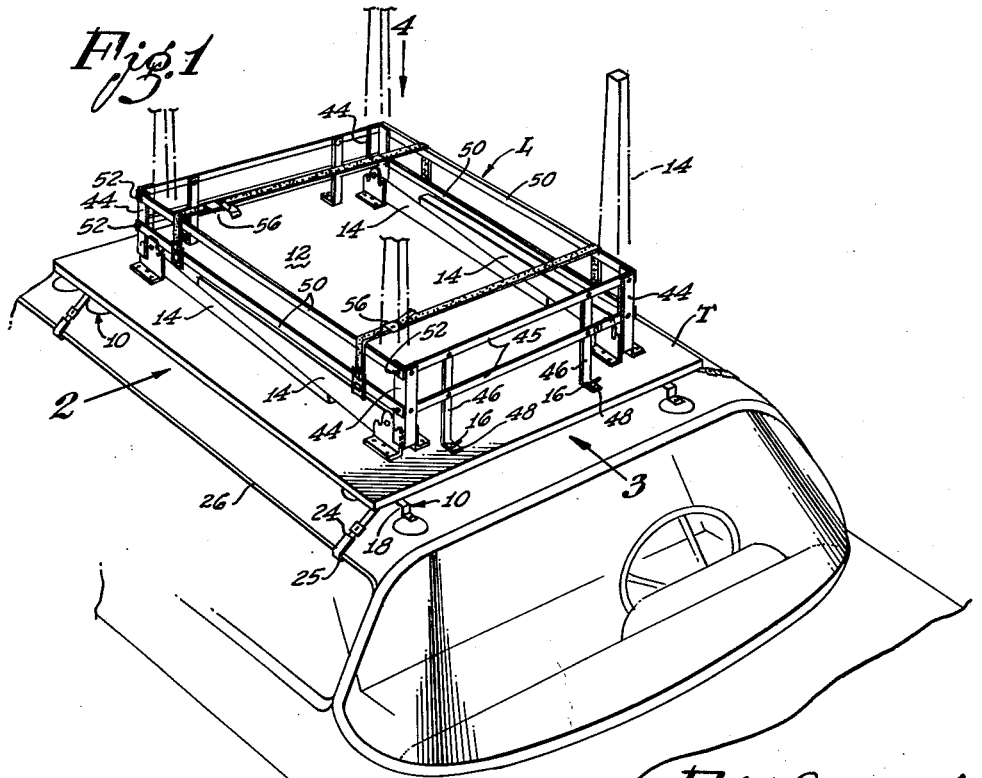
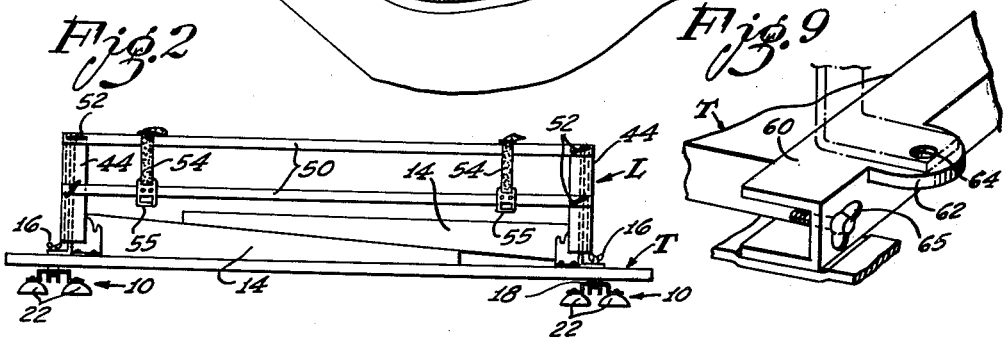
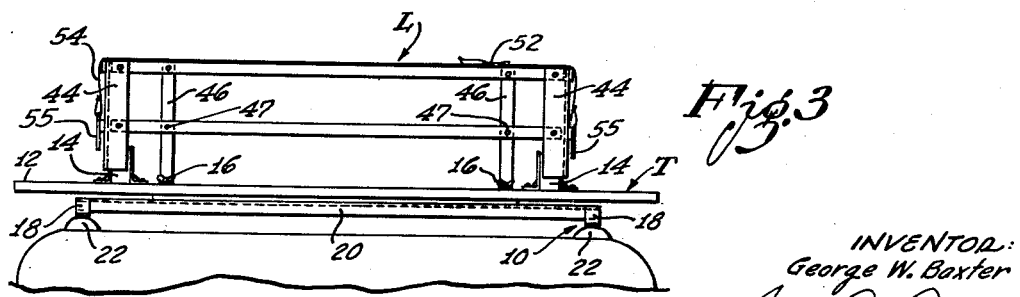
INVENTOR:
George W. Baxter Nov. 21, 1961  G. W. BAXTER  3,009,615
TABLE AND LUGGAGE CARRIER ASSEMBLY
Filed March 20, 1959  2 Sheets-Sheet 2
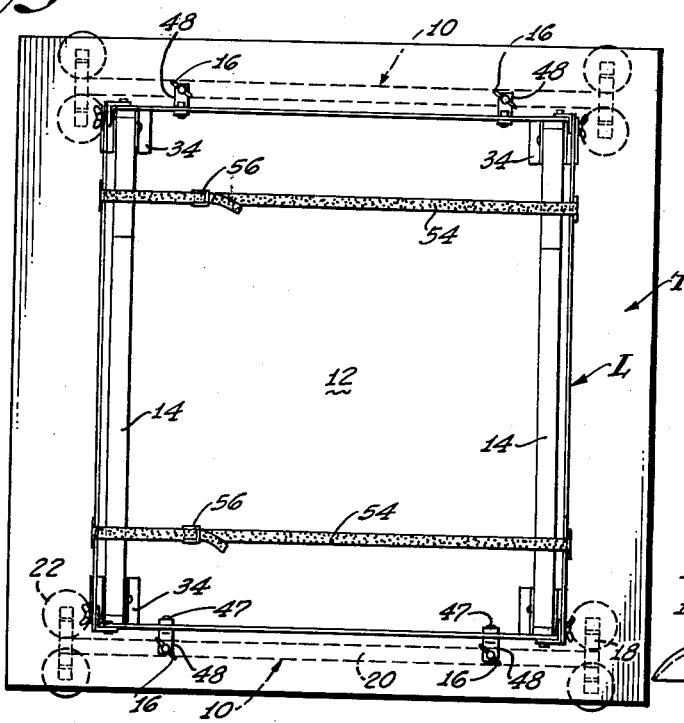
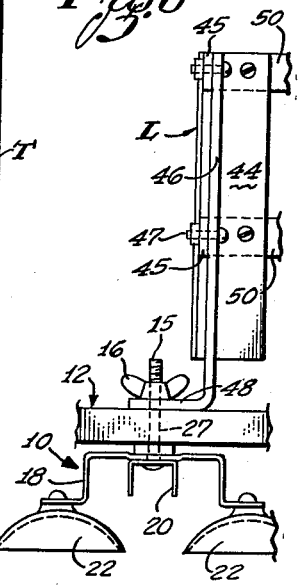
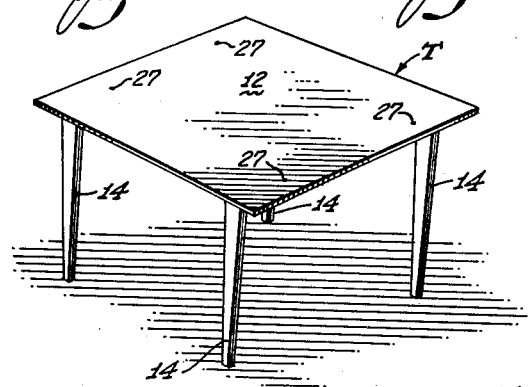
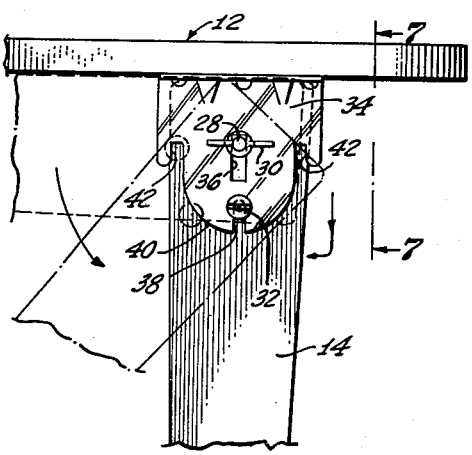
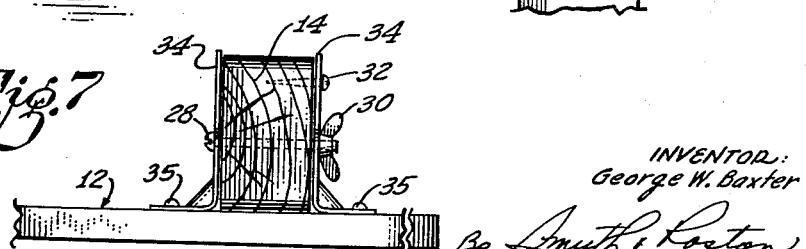
INVENTOR:
George W. Baxter

United States Patent Office 3,009,615
Patented Nov. 21, 1961

3,009,615
TABLE AND LUGGAGE CARRIER ASSEMBLY
George W. Baxter, 13011 S. Ruthellen Ave.,
Gardena, Calif.
Filed Mar. 20, 1959, Ser. No. 800,767
10 Claims. (Cl. 224—42.01)

This invention relates to a combination of a table and luggage carrier which may be assembled for transportation of luggage and the like on the top of a vehicle such as an automobile.

I am aware that it is old to combine a picnic table with frame structure for mounting on the top of an automobile to retain luggage during travel. There are, however, numerous disadvantages in such prior art combinations.

One of these disadvantages is that the adaptation of a table to serve as part of a luggage carrier structure involves the addition of structure and fittings to the table that are not characteristic of tables which are used solely as articles of furniture. These structural additions are too often unsightly and, in many instances, are actually obstructions that interfere with normal use of the table.

Another common disadvantage is that the task of assembling and anchoring the combined structure on the top of a car is a tedious and time-consuming procedure and the structure must be completely dismantled and later installed again when a stop is made with the intent of using the table.

Another common disadvantage is that luggage stored on the structure for transportation is difficult of access for removal. It is often necessary to stand on some object adjacent the car to be able to reach the luggage and, of course, it is not often possible to find some object that avoids the hazard of a fall. A still further disadvantage is that many combination structures of this type are of unduly expensive construction. The cost should be relatively low to make such a device widely usable for outdoor picnics, camping and traveling.

The present invention avoids all of these disadvantages by employing a base structure to support a conventional table with folded legs and by further providing a luggage frame for mounting on top of the table, the table being releasable from the base structure and the luggage frame being releasable from the table. By virtue of this arrangement, the base structure need not be removed from the top of the automobile whenever the table is removed. In fact, the base structure may be permanently mounted on the car.

A feature of the presently preferred embodiment of the invention is that a single set of four screws equipped with four easily operable wing nuts extend through the table top to serve the purpose of not only anchoring the table to the base structure but also of anchoring the luggage frame to the table. Thus it requires merely the removal of four thumb nuts to free the table for use.

An outstanding advantage of this basic combination is that the table is not equipped with any special structure or fittings whatsoever to enable it to cooperate with the base structure and the luggage frame in the completed assembly. In this initial embodiment of the invention, the table differs from other tables with folded legs only in having four apertures to receive the four anchoring screws. These apertures are inconspicuous and may easily be covered in a decorative manner. Thus the invention makes it possible to use a table as a part of the equipment of a household in the same manner as any conventional table and to use the same table for picnics and camping.

With reference to the accessibility of luggage carried by the assembly, a feature of the invention is the concept of mounting the luggage frame in a slidable manner on top of the folded table. When the four thumb nuts are removed, the luggage carrier is free to slide past the folded legs to a position where the luggage is easily accessible. A further feature of the invention in this regard is the concept of making a side of the luggage frame removable so that it is not necessary to lift luggage over the frame.

The features and advantages of the invention will be apparent from the following detailed description considered with the accompanying drawings.

In the drawings, which are to be regarded as merely illustrative:

FIG. 1 is a perspective view showing the initial embodiment of the invention completely assembled on the top of an automobile;

FIG. 2 is a side elevation of the assembled structure viewed as indicated by the arrow 2 of FIG. 1;

FIG. 3 is an end elevation of the assembled structure viewed as indicated by the arrow 3 of FIG. 1;

FIG. 4 is a plan view of the assembled structure viewed as indicated by the arrow 4 of FIG. 1;

FIG. 5 is a fragmentary view in side elevation showing the manner in which a leg is foldably attached to the underside of the table top;

FIG. 6 is a perspective view of the table with the legs unfolded for use;

FIG. 7 is a fragmentary elevational view of a folded leg, the view being taken as indicated by the line 7—7 of FIG. 5;

FIG. 8 is a fragmentary elevational view showing how a single screw both attaches the table to the base structure and attaches the luggage frame to the table; and FIG. 9 is a fragmentary perspective view of a modification of the invention that makes it unnecessary to provide apertures in the table top.

The principal parts of the initial embodiment of the invention illustrated in the drawings include: a base structure comprising a pair of spaced base frames, each of which is generally designated 10; a table generally designated T having a top 12 and four foldable legs 14, the table being positioned upside down on the two base frames 10; a luggage frame generally designated L of open rectangular construction; and four upwardly extending screws 15 equipped with wing nuts 16 for anchoring the table T to the base frames 10 and for anchoring the luggage frame L to the table T.

The base structure may be of any suitable construction. In this instance, each of the base frames 10 comprising the base structure is a well-known commercially available structure comprising a pair of leg brackets 18 which are rigidly interconnected by an inverted channel member 20. Each of the leg brackets 18 is of angular configuration to form a pair of spaced legs and a rubber suction cup 22 of a well-known type is mounted on each leg for suction engagement with the top of the vehicle. Each of the base frames 10 is provided with a pair of adjustable straps 24 which are attached to the opposite ends of the frame and which are provided with hook fittings 25 to engage the upturned beads 26 along the opposite side edges of the roof of the automobile.

The top 12 of the table T is suitably thick and rigid to support luggage on the two base frames 10 and, of course, should be waterproof. Any suitable material may be used. The table top is provided with four inconspicuous bores 27 to receive the previously mentioned upwardly extending screws 15. The legs 14 may be foldably mounted on the table top 12 in any suitable manner. In the present embodiment of the invention, the table legs 14 are foldably mounted by the structure shown in FIGS. 5 and 7.

As shown in FIGS. 5 and 7, each leg 14 is equipped with a pivot screw 28 that extends through the leg and is equipped with a wing nut 30. The leg is also equipped with a lug which may be in the form of a wood screw 32. The upper base portion of the leg 14 is slidably confined between a pair of angular sheet metal brackets 34 which are anchored to the table top 12, for example by suitable screws 35. Each of the brackets 34 is provided with a vertical slot 36 through which the pivot screw 28 extends and is further provided with a downwardly directed open slot 38 to receive the lug or wood screw 32 and to cooperate therewith to hold the leg in its operative position for supporting the table top 12. Each of the brackets 34 is further formed with an arcuate edge 40 that is concentric to the lower end of the vertical slot 36. This arcuate edge terminates at its opposite ends in a pair of downwardly directed notches 42, one of which engages the lug or wood screw 32 in the folded position of the leg for stabilizing the folded leg.

When a leg 14 cooperates with the other three legs to support the table top 12, the pivot screw 28 of the leg is at the upper end of the vertical slot 36, as shown in FIG. 5, and the lug or wood screw 32 is at the upper end of the lower open slot 38. Thus the pivot screw 28 and the lug or wood screw 32 provide two points for connecting the leg 14 to the pair of brackets 34 to maintain the leg in its upright position with the table top resting flat on the upper butt end of the leg to transmit the load to the leg rather than to the pivot screw 28. The wing nut 30 is tightened to secure the leg in this operative position.

To fold a leg 14, it is merely necessary to loosen the wing nut 30 and shift the leg longitudinally to shift the pivot screw 28 to the lower end of the pivotal slot 36 and at the same time to shift the lug or wood screw 32 clear of the open slot 38. The leg is then rotated about the pivot screw 28 to cause the lug or wood screw 32 to travel along the arcuate edge 40 of the corresponding bracket 34 to seat in one of the notches 42. The wing nut 30 may then again be tightened to secure the leg in its folded position against the underside of the table top.

The luggage frame L may be of various constructions in vairous specific practices of the invention. In this instance, the luggage frame L comprises two end frames, each of which is formed by a pair of upright corner angle irons 44 and two transverse metal bars 45 that are rigidly attached to the corner angle irons. Each frame end further includes a pair of upright metal straps 46 that are rigidly connected to the metal bars 45 by nut-equipped screws 47 (FIG. 8) and which are formed with flanges 48 at their lower ends to slidingly support the luggage frame on the surface of the table top 12. These flanges 48 are suitably apertured to receive the previously mentioned screws 15 that secure the luggage frame in its assembled position.

The luggage frame L is completed by a pair of parallel longitudinal metal bars 50 which are attached at their opposite ends to the corner angles 44. In the present embodiment of the invention, the longitudinal bars 50 are pivotally connected to the corner angle irons and the pivots may be tightened to make the luggage frame rigid. For this purpose, the longitudinal bars 50 may be attached to the corner angle irons 44 by screws equipped with wing nuts 52.

For the purpose of conveniently securing luggage inside the luggage frame L, the luggage frame may be provided with a pair of adjustable straps 54. Each strap 54 comprises two pieces, each piece being anchored to a longitudinal bar 50 of the luggage frame by a conventional fitting 55 and the two pieces of the strap being adjustably interconnected by suitable buckle means 56.

The manner in which the invention serves its purpose may be readily understood from the foregoing description. The two base frames 10 are first anchored by the straps 24 in positions for accurate alignment of the screw holes of the base frames with the four bores 27 of the table top 12. As heretofore stated, once the base frames 10 are installed in this manner, they may be left on the car permanently, this fact being one of the features of the invention. It is a simple matter to fold the legs of the table T and place the table on the two base frames 10 and then to place the luggage frame on top of the table. It is preferable to mount the folded table in upside down position as shown in the drawings to keep the table legs from marring the automobile and to keep the luggage from marring the top surface of the table. The folded table may be mounted in upright position if desired, however.

It is then necessary merely to install the four screws 15 and tighten the four wing nuts 16 to complete the assembly in preparation for placing luggage inside the luggage frame L to rest on the inverted table top 12. In the present embodiment of the invention, the legs 14 are enclosed by the luggage frame L to give the assembly a neat appearance and also to protect the legs. Luggage that is placed inside the luggage frame L is secured by the two straps 54.

When its is desired to use the table T, it is a simple matter to remove the four wing nuts 16 for freeing the table from the base frames 10 and for simultaneously freeing the luggage frame L from the table.

The two longitudinal bars 50 on one side of the luggage frame may be removed to make the luggage even more conveniently accessible. In fact, it is not necessary to manipulate the buckle means 56 of the two straps 54 since removing the two longitudinal bars 50 from one side of the luggage frame releases the two straps.

It is apparent that the structure may be quickly assembled in the same easy and convenient manner. If desired, the structure may be reassembled and the luggage loaded simply by following the previously described steps in reverse order. Thus the luggage may be placed inside the luggage frame L with the luggage frame shifted to a convenient location and with one side of the luggage frame removed.

One of the advantages of the described construction is that the luggage frame L may be collapsed for compact storage when not in use. For this purpose, the eight wing nuts 52 that pivotally secure the longitudinal bars 50 may be slightly loosened to permit a collapsing action in which each of the pairs of longitudinal bars 50 functions as a pair of parallel links to maintain the frame ends substantially parallel.

Another advantage of the described construction is that with the folding legs 14 inside the luggage frame L, the legs may be unfolded or extended upward in the position shown in phantom in FIG. 1. With the four legs extended upward in this manner, they may serve as means to secure luggage that is piled much higher than the height of the luggage frame L.

FIG. 9 shows how each of the two base frames may be modified to make it unnecessary to provide holes in the table top. The base frame in FIG. 9 comprises a channel member 60 that is mounted on the upper side of a pair of the previously described leg brackets 18. Each of the channel members 60 has a pair of integral ears 62 with apertures 64 therein to receive the previously mentioned screws 15 for releasably mounting the luggage frame L. The table top 12 slides edgewise into the channel members 60 of the two base frames 10a and is releasably secured by thumb screws 65 which block the path of removal of the table top.

This modification not only makes it unnecessary to aperture the table top but also protects opposite edges of the table top. An additional advantage is that the table may be removed from the top of the automobile without the necessity of also removing the luggage frame.

My description in specific detail of the selected embodiment of the invention will suggest various changes, substitutions and other departures from my discolsure within the spirit and scope of the appended claims.

I claim:
1. A table and luggage carrier assembly for transportation on a vehicle roof, comprising: a base structure for anchorage to the vehicle roof; a table on said base structure, said table having a table top and folded legs, said table being positioned upside down with the folded legs uppermost; a luggage frame on the upper side of the folded table, said luggage frame enclosing said folded legs; and a plurality of releasable fastening means, each of said means extended through a portion of said base structure, a portion of the top of said table and a portion of said luggage frame for anchoring the table to the base structure and for anchoring the luggage frame to the table, whereby loosening of said fastening means both releases the table from the base structure and releases the luggage frame from the table.

2. A combination as set forth in claim 1 in which each of said fastening means comprises upwardly extending screw means and a wing nut on the upper end of the screw means in abutment with a portion of said luggage frame.

3. A table and luggage carrier assembly for transportation on a vehicle roof, comprising: a base structure comprising separate components securable in spaced relation upon the vehicle roof; a table having a table top and folded legs on the underside of the table top; a luggage frame, said table being in upside down position with the folded legs uppermost and spanning said components to form the base of the luggage frame, said luggage frame, table and base being separable; and releasable means for anchoring the table to said base structure and for fastening the luggage rack to the base structure in a position to encompass the folded legs of the table.

4. A combination as set forth in claim 3 in which the depth of said luggage frame is substantially less than the length of the folded legs whereby the legs of the upside down table may be unfolded upward inside of the luggage frame to extend higher than the luggage frame to serve as means for securing luggage piled higher than the luggage frame.

5. A combination as set forth in claim 3 in which said luggage frame has removable side members; and in which the luggage frame is provided with luggage-retaining flexible straps extending across the open top of the luggage frame, the ends of said straps being anchored to said removable side members whereby releasing the side members from the luggage frame releases the corresponding ends of the straps.

6. A combination as set forth in claim 3 in which said luggage frame comprises two frame ends interconnected on opposite sides by frame members pivotally connected thereto to make the luggage frame foldable.

7. A combination as set forth in claim 3 in which said base structure has opposed channels to slidingly receive opposite edges of the top of said table, and which includes means to releasably retain the table edges in the channels.

8. A combination as set forth in claim 7 which includes means for releasably connecting said luggage frame to said base structure independently of the table to permit either the table or the luggage frame to be removed independently of the other.

9. A combination as set forth in claim 3 in which said base structure provides a forward rearwardly facing channel and a rearward forwardly facing channel parallel thereto; in which said table top is dimensioned to slide in said channels to a stored position under the luggage frame to serve as the base for the luggage frame to support luggage inside the luggage frame; and which includes means to releasably secure the table in said stored position.

10. A combination as set forth in claim 9 in which said luggage frame encloses the folded legs at said stored position of the table with clearance for the legs to be unfolded upward inside the luggage frame, the length of the folded legs being substantially greater than the depth of the luggage frame whereby the unfolded legs extend higher than the luggage frame to serve as means for securing luggage piled higher than the luggage frame.

References Cited in the file of this patent

UNITED STATES PATENTS

| 2,708,613 | Heckman | May 17, 1955 |
| 2,892,481 | Seward | June 30, 1959 |

FOREIGN PATENTS

| 105,463 | Sweden | Sept. 8, 1942 |
| 61,887 | France | Dec. 8, 1954 |
| 154,999 | Australia | Feb. 3, 1954 |
| 852,505 | France | Oct. 30, 1939 |
| 1,092,494 | France | Nov. 10, 1954 |